March 25, 1941. S. B. POOLE 2,236,128
APPARATUS FOR REMOVING SLUDGE FROM SEWAGE TANKS AND THE LIKE
Filed Sept. 14, 1938 4 Sheets-Sheet 1

Inventor:
Sydney Bennett Poole,
per Ferdinand Broter Bonhardt
Attorney.

March 25, 1941. S. B. POOLE 2,236,128
APPARATUS FOR REMOVING SLUDGE FROM SEWAGE TANKS AND THE LIKE
Filed Sept. 14, 1938 4 Sheets-Sheet 4

Inventor.
Sydney Bennett Poole.
per Ferdinand Broster Bonhardt
Attorney.

Patented Mar. 25, 1941

2,236,128

UNITED STATES PATENT OFFICE 2,236,128

APPARATUS FOR REMOVING SLUDGE FROM SEWAGE TANKS AND THE LIKE

Sydney Bennett Poole, Radcliffe, near Manchester, England

Application September 14, 1938, Serial No. 229,920
In Great Britain February 28, 1938

5 Claims. (Cl. 210—3)

This invention relates to that kind of apparatus for removing sludge from sewage tanks and the like wherein means are caused to travel above the bottom of the tank and sludge is discharged through the said means by hydrostatic head.

Hitherto the said means comprised a single perforated pipe extending across or half way across the tank and discharging from a single outlet situated at the requisite distance below the normal liquid level in the tank.

The object of my invention is to provide a novel form of apparatus of the said kind which amongst other advantages enables the sludge to be removed uniformly from all parts of the sewage tank or the like in such a manner that there is no undesired accumulation in some parts whilst only liquid is being drawn from other parts.

An apparatus of the hereinbefore specified kind for removing sludge from sewage tanks and the like in accordance with my invention comprises a plurality of nozzles each of which sweeps a different portion of the bottom of the sewage tank or the like and has a separate discharge passage delivering sludge over a separate sludge weir situated below the normal liquid level into a passage the bottom of which is also situated below the said liquid level.

The sludge received by the passage may be discharged either by gravity or a syphon or power.

The said weirs are preferably arranged adjustable whereby the hydrostatic head can be varied separately for each nozzle.

The said nozzles may be provided with circular inlet apertures but I prefer to provide them with one or more inlet slots which may or may not be arranged adjustable in size.

The said nozzles may be connected to the weirs by upwardly projecting pipes adapted to be swung jointly or singly and with or without the said passage into a position above the normal liquid level or above the top of the sewage tank or the like to enable the nozzles to be easily cleaned without emptying the sewage tank or the like; and/or to enable the sludge collecting apparatus to be moved from one sewage tank or the like to another.

The said passage, which travels with the nozzles, may be provided with a de-scumming weir adapted to be closed or otherwise rendered inoperative when not required.

Access to the sludge weirs is preferably provided.

The said access may be arranged for by providing the said passage with an open top situated above water level and through which the sludge weirs are accessible and visible, the said open top being provided or not with a removable cover or covers.

An important advantage of the hereinbefore described form of apparatus is that it enables all conduits to be so arranged that they can have a cleaning implement pushed into them for cleaning purposes.

I attain the hereinbefore stated object by the means illustrated in the accompanying drawings, wherein—

Figure 1:
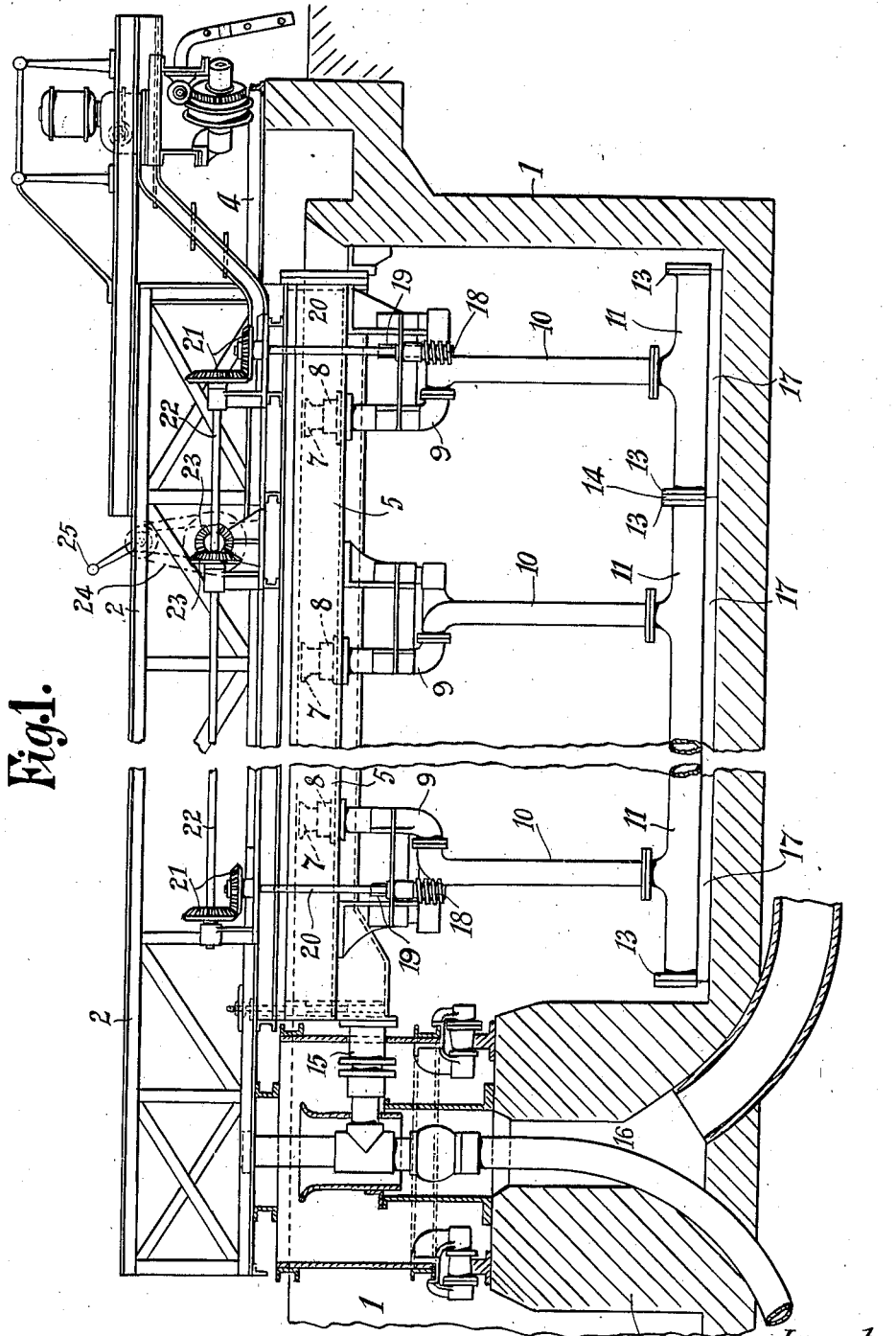
Figure 1 is a front view, partly in section of an apparatus for removing sludge from a sewage tank.
Figure 2:
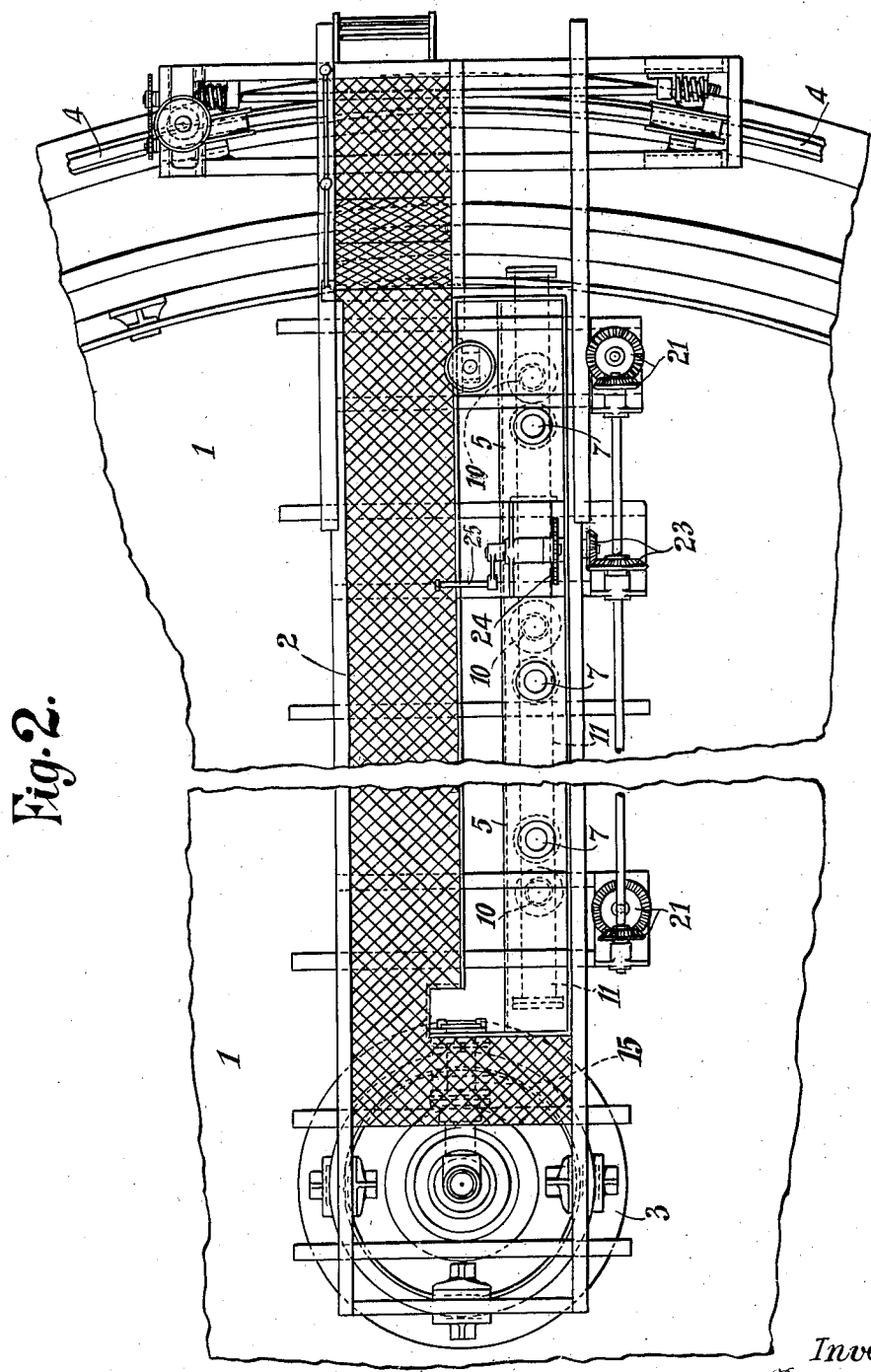
Figure 2 is a plan view thereof.
Figure 3:
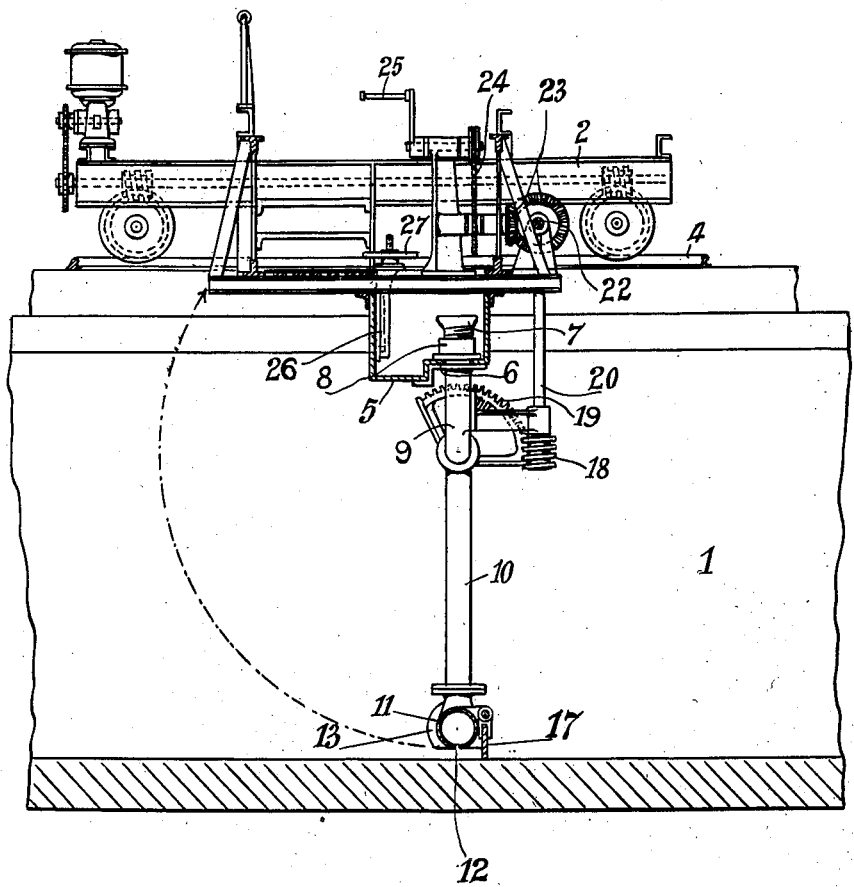
Figure 3 is an end view in section thereof.

Referring to the drawings, in the construction shown in Figure 1, as applied by way of example to a circular sewage tank 1 or the like, I provide a travelling gantry 2 one end of which is rotatably mounted on a central pillar 3 provided in the sewage tank 1 or the like and the other end of which travels on a circular track 4 around the sewage tank 1 or the like, the gantry 2 thus extending half way across the sewage tank 1 or the like and rotating above the same.

The gantry 2 carries a trough 5 which is radial to the sewage tank 1 or the like and extends from the periphery to near the centre thereof. The bottom of the trough 5 is situated below normal water level and the top is situated above the same. In the trough there are projecting upwardly from a step 6 in the said bottom a longitudinal row of bell-mouthed vertical pipes 7 the enlarged orifices of which constitute horizontal circular sludge weirs. The pipes 7 are vertically adjustable separately to enable the heights of the orifices to be independently adjustable, for example by screwing them into and out of bosses 8 secured to the trough 5. The pipes 7 communicate with apertures in the step 6, and beneath the trough 5 there are a corresponding number of depending elbow pipes 9 secured to the underside of the trough 5 and each communicating with one of the said orifices. Each elbow pipe 9 has a depending elbow pipe 10 swivellably connected at its upper end to its lower elbowed end. Each of the elbow pipes 10 has secured to its lower end a horizontal nozzle pipe 11 having an inlet slot 12 extending along its underside in a position where it can receive the sludge lying on the floor of the sewage tank 1 or the like. Each of the nozzle pipes 11 has no communication with the others, but all the said nozzle pipes may be connected together mechanically end to end in alignment with each other. The nozzle pipes 11 each sweep a different part of the said floor, but they jointly sweep the whole of the said floor. The nozzle pipes are connected together for example by the aid of flanges 13 provided on the open ends thereof, a blank plate 14 being provided between each two adjacent ends to close them from each other.

A pipe 15 is connected to the inner end of the trough 5 to empty the trough 5 continuously by a syphon action or, as shown, by gravity. The pipe 15 may extend down a central hole 16 in the said pillar. A squeegee 17 may be hinged to each nozzle pipe 11 to assist the action of the nozzle pipes 11.

In use the nozzle pipes 11 are caused by the travelling gantry 2 to travel circularly and sweep the whole of the floor of the sewage tank 1 or the like. The sludge in which the slots 12 are immersed is caused by the hydrostatic pressure of the head of liquid above it to enter the nozzle pipe 11 and flow up through the elbow pipes 10 and 9 and the weir pipes 7, and over the sludge weirs into the trough 5. The sludge then flows along to the inner end of the trough 5 where it is discharged through the pipe 15.

The rate of flow of sludge through each nozzle pipe 11 is dependent on the distance at which the sludge weir of the weir pipe 7 serving the said pipe 11 is situated below water level. Therefore by arranging or adjusting the weir pipes 7 so that the sludge weirs are at different distances below the said level, the rate of flow from one nozzle pipe 11 can be made different from those of the other nozzle pipes 11. Therefore the rate of removal of sludge from one portion of the sewage tank 1 or the like can be made greater or less than that at another portion so that no portion shall become free of sludge before another. Furthermore if liquid enters the apparatus, it can interfere with the sludge removing action of one nozzle pipe 11 only and not of the whole apparatus. The trough 5 is vertically above the nozzle pipes 11 and the connections between the nozzle pipes 11 and trough 5 are consequently of minimum length. Therefore a minimum of resistance to the hydrostatic pressure is obtained and the danger of blockage is reduced. Furthermore a flexible cleaning rod or wire can be readily pushed through each of the bell mouthed weir pipes 7 and the elbow pipes 9 and 10 down to the nozzle pipe 11 at any time without dismantling any of the parts. The nozzle pipes 11 can also be raised by swivelling the elbow pipes 10 on the elbow pipes 9, for example through the medium of a device comprising worms 18 and segments 19 and operated from the travelling gantry for example through shafts 20, pairs of gear wheels 21, a shaft 22, a pair of gear wheels 23, a pair of sprocket wheels connected by a driving chain 24 and a crank handle 25. When the nozzle pipes 11 are raised, their slots 12 can be cleaned with a brush or scraper wielded from the travelling gantry 2. It is thus a simple matter to ensure and maintain an efficient action of the apparatus.

If desirable the slots 12 may be arranged adjustable, for example by providing one side of the slot 12 on a hinged flap forming part of the nozzle pipe 11 so that the width of the slot can be increased or diminished by turning the flap on its hinge. A rod pivotally connected to the flap and extending upwards to the travelling gantry 2 may be provided to turn the flap and if desired to also hold it in any position of adjustment.

A scum decanting penstock 26 is preferably provided at one side of the trough 5, whereby, when required, scum which floats on the liquid can be decanted into the trough 5 and be discharged therefrom in the same manner as the sludge. The penstock 26 is movable as usual into and out of operative position by means of a hand wheel 27. The top of the trough 5 may be provided with removable covers.

A similar construction to that hereinbefore described can be employed for removing sludge from rectangular sewage tanks and the like, the travelling gantry 2 and trough 5 being however arranged to extent across and travel along the tank and the series of nozzle pipes 11 being arranged to extend across and sweep the width of the rectangular sewage tank or the like. The sludge from the trough 5 is discharged by a syphon or by power into a longitudinal channel provided at one side of the sewage tank or the like. In this construction, instead of arranging the nozzle pipes 11 only to be swung up, both the trough 5 and the nozzle pipes 11 may be arranged to be swung up together so that they can be raised clear of top of the sewage tank or the like in order to enable the travelling gantry to travel to and the nozzle pipes 11 to be lowered into and used in one or more further sewage tanks or the like.

Figure 4:
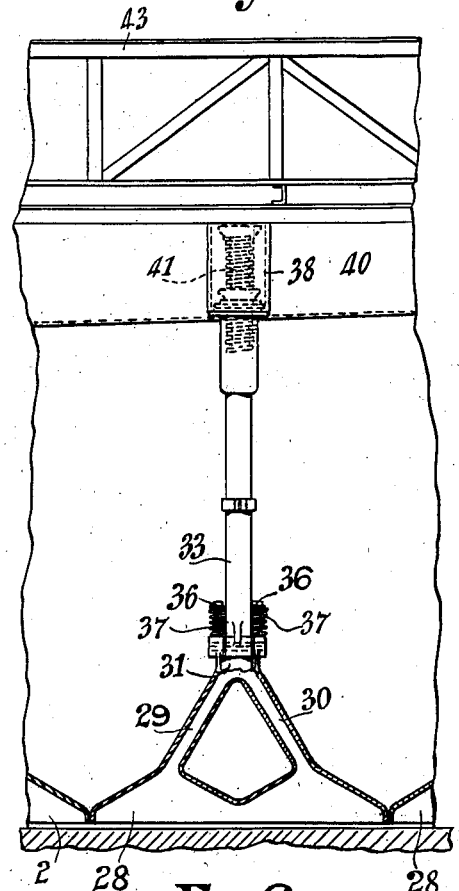
Figure 4 is a fragmentary front view partly in section, of a portion of an apparatus for removing sludge from a sewage tank and illustrates another construction.
Figure 5:
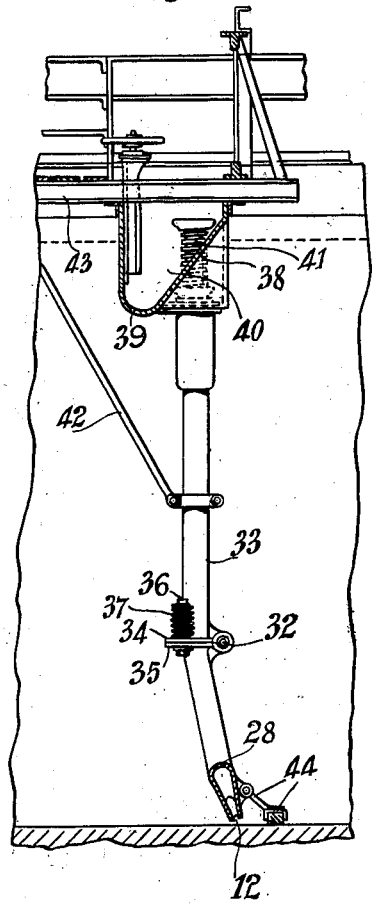
Figure 5 is a fragmentary end view in section thereof.
Figure 6:
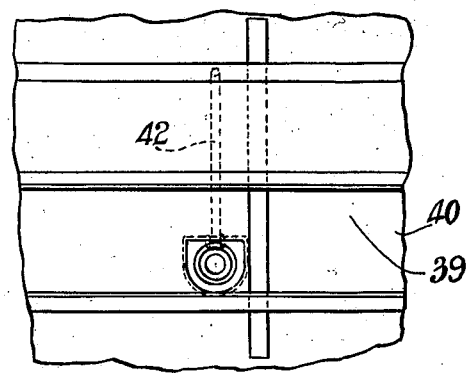
Figure 6 is a fragmentary plan view thereof.

In the construction illustrated in Figures 4 to 6 each nozzle piece 28 has an interior which, regarded in end sectional view, see Figure 5, widens from the nozzle orifice upwards, but regarded in front sectional view, see Figure 4, narrows into two passages 29 and 30 which join again at 31 whereby a more uniform suction along the length of the nozzle orifice is attained. Each nozzle piece 28 is mechanically separate from the others and is hinged at 32 to a vertical pipe 33 having a flange 34 forming a seat for a flange 35. Rods 36 are connected to the flange 35 and project through clearance holes in the flange 34. Above the flange 34, helical compression springs 37 are provided on the rods. The upper ends of the compression springs 37 are held against axial movement on the rods 36 and the lower ends of the said springs rest on the flange 34. Each nozzle pipe 28 is thus free to swing automatically on its pivot 32 against the action of the springs 37 on encountering an obstacle and returns to its operative position when it has ridden over the obstacle, whereby damage to the apparatus by solid objects in the sewage tank or the like is avoided. The springs 37 ensure a tight joint between the nozzle pipe 28 and the pipe 33 under normal conditions.

The pipe 33 is secured to an external lug 38 provided laterally on a substantially V-sectioned trough 40 with rounded floor 39. The lug 38 is hollow and its interior communicates with the interior of the trough 40. The lug 38 has an aperture, and a weir pipe 41 extends through the lug 38 and aperture therein and is screwed into the upper, enlarged end of the pipe 33. The weir pipe has a bell-shaped upper end the rim of which forms the circular weir.

The pipe is steadied by a steady rod 42 suitably secured to the gantry 43.

It will be appreciated that if desired nozzle pipes similar to the nozzle pipes 28 may be employed in place of the nozzle pipes 11 either with or without the hereinbefore described provision for automatic yielding of the nozzle pipe on meeting a solid obstruction. If such provision is made, a lifting mechanism such as that comprising the worm 18 and segment 19 is provided to turn each of the pipes 10 in an upward direction when required for cleaning and so forth. All of these worms may be driven jointly or separately. When driven separately, individual nozzle pipes can be raised independently of the others for cleaning or inspection.

A scum decanting penstock 43 may be provided on the trough 40. Each nozzle pipe 28 may be provided with a squeegee 44.

I claim—

1. An apparatus for removing sludge from a sewage and the like tank, comprising in combination, means for producing a normal liquid level in the tank, a gantry above the tank, means for supporting the gantry above the tank, means for traversing the gantry over the tank, a sludge conduit supported by the gantry with the lower part of the conduit below and the upper part thereof above the normal level of liquid in the tank, an outlet pipe connected to the conduit, a plurality of sludge pipes connected to the conduit with their open tops situated below the said normal level and forming sludge weirs, and a plurality of elongated nozzles provided on the sludge pipes in alignment with each other for sweeping the bottom of the tank.

2. An apparatus for removing sludge from a circular sewage and the like tank, comprising in combination, means for producing a normal liquid level in the tank, a gantry above the tank and extending from the periphery to the centre thereof, means for supporting the gantry above the tank, means for rotating the gantry over the tank, a sludge conduit supported by the gantry with its upper portion situated above the normal liquid level in the tank and its lower portion situated below the said level, a sludge outlet pipe connected to the conduit at that end which is nearest the centre of the tank for discharging the sludge centrally of the tank, a plurality of sludge inlet pipes connected to the sludge conduit and terminating near the bottom of the tank, weirs arranged in the conduit at a level below the normal liquid level for controlling separately the inlet of sludge from the inlet pipes into the sludge conduit, means for adjusting the said weirs, and elongated nozzles connected to the inlet pipes in alignment with and abutting against one another for sweeping over and thereby drawing sludge directly from the whole surface of the bottom of the tank.

3. An apparatus for removing sludge from a sewage and the like tank, comprising in combination, means for producing a normal liquid level in the tank, a plurality of nozzles, a travelling gantry, means for supporting the gantry above the tank, means for driving the gantry, a conduit supported by the gantry with the upper part of the conduit above and the lower part below the normal sewage level in the tank, a plurality of upwardly projecting pipes connected separately to the said nozzles and to the said conduit, and a weir arranged below normal liquid level and provided at the upper end of each of the said pipes for discharging sludge therefrom into the conduit.

4. An apparatus according to claim 1, comprising means for permitting tilting of each nozzle separately on encountering an obstruction to its normal movement and means for automatically returning each nozzle separately to its initial position after it has passed over the obstruction.

5. An apparatus according to claim 1, comprising hinge means connecting each nozzle to its sludge pipe for permitting the nozzle to tilt upwardly to the rear on meeting an obstruction, and compression spring operating between each nozzle and its sludge pipe for returning the nozzle to its initial position after tilting.

SYDNEY BENNETT POOLE.